(12) United States Patent
Shao

(10) Patent No.: US 12,287,508 B1
(45) Date of Patent: Apr. 29, 2025

(54) LUMINOUS BOARD

(71) Applicant: Xian Shao, Lishui (CN)

(72) Inventor: Xian Shao, Lishui (CN)

( * ) Notice: Subject to any disclaimer, the term of this patent is extended or adjusted under 35 U.S.C. 154(b) by 0 days.

(21) Appl. No.: 19/026,603

(22) Filed: Jan. 17, 2025

(30) Foreign Application Priority Data

Nov. 19, 2024 (CN) .......................... 202422832796.9

(51) Int. Cl.
F21V 8/00 (2006.01)
F21V 23/04 (2006.01)

(52) U.S. Cl.
CPC ........ *G02B 6/0085* (2013.01); *F21V 23/0435* (2013.01); *F21V 23/0485* (2013.01); *G02B 6/0011* (2013.01); *G02B 6/0088* (2013.01)

(58) Field of Classification Search
CPC .. G02B 6/0085; G02B 6/0088; G02B 6/0011; F21V 23/0435; F21V 23/0485
See application file for complete search history.

(56) References Cited

FOREIGN PATENT DOCUMENTS

CN 209672120 U * 11/2019
CN 210667206 U * 6/2020

* cited by examiner

Primary Examiner — Mary Ellen Bowman
(74) Attorney, Agent, or Firm — WPAT, PC

(57) ABSTRACT

A luminous finished board includes a wooden frame. Sides of a first aluminum alloy frame and sides of a second aluminum alloy frame are each in contact with inner walls of a first placement groove. A light strip is in contact with inner walls of plug-in cavities. Through the design of structures such as the first aluminum alloy frame, the second aluminum alloy frame, and the sealing plate, the plug-in cavities defined within the first and second aluminum alloy frames, and the light guide plate and the light strip disposed in the plug-in cavities, and setting of the first and second aluminum alloy frames disposed inside the luminous board, it facilitates the installation process. By having the light strip in contact with the first and second aluminum alloy frames, the heat generated by the light strip during operation can be conducted through the first and second aluminum alloy frames.

10 Claims, 12 Drawing Sheets

LUMINOUS BOARD

TECHNICAL FIELD

The disclosure relates to the technical field of luminous decoration, and particularly to a luminous board.

BACKGROUND

Luminous finished panels are finished sheet materials widely used in various lighting and decorative fields. Luminous decoration are creative products that combine lighting with decorative components. They not only enhance the aesthetics of a space but also create a unique atmosphere. The luminous decorations refer to products that can emit light at night or in the dark through built-in light sources. The decorative component can be categorized based on different materials, shapes, and uses. For example, the decorative component may include a resin luminous decorative component, a crystal ball luminous decorative component, or the like.

There are heat dissipation issues for the existing luminous finished panels during use. Specifically, when light-emitting diode (LED) light sources of the existing luminous finished panels emit light, most of electrical energy from the existing luminous finished panels is converted into heat rather than light energy, thereby leading to generate a significant amount of heat during operation of the LED light sources. Therefore, a type of luminous finished panel that addresses these heat dissipation concerns is proposed here.

SUMMARY

The purpose of the disclosure is to provide a luminous finished board that can reduce temperature generated by an operation of light strips, achieve cooling of the light strips, thereby improving a service life of the light strips and reducing a maintenance frequency of the device, in order to solve the problems raised in the background technology mentioned above.

The technical solutions of the disclosure are as follows.

A luminous finished board includes a wooden frame. The wooden frame defines a first placement groove and a second placement groove therein, a first aluminum alloy frame and a second aluminum alloy frame are attached onto the first placement groove through double-sided adhesive or adhesive, and sides of the first aluminum alloy frame and sides of the second aluminum alloy frame are each in contact with inner walls of the first placement groove. Each of the first aluminum alloy frame and the second aluminum alloy frame defines a plug-in cavity, a light guide plate is inserted in the plug-in cavity, and sides of the light guide plate are surrounded by a light strip, the light strip is in contact with inner walls of the plug-in cavity. A control circuit board and a battery are attached onto the sides of the light guide plate through the double-sided adhesive or the adhesive. The light strip and the battery are both electrically connected to the control circuit board, and a sealing plate is attached onto the second placement groove through the double-sided adhesive or the adhesive and is configured to seal the wooden frame.

In an embodiment, a switch identifier is disposed on a side wall of the wooden frame, and a touch switch is attached on to an inner side of the wooden frame close to the switch identifier through the double-sided adhesive or the adhesive.

In an embodiment, the touch switch is electrically connected to the control circuit board.

In an embodiment, the wooden frame defines an observation hole, and an optical fiber is inserted in the observation hole. The first aluminum alloy frame defines a through-hole, the optical fiber is disposed in the through-hole, an indicator light is disposed on the control circuit board and is connected to the control circuit board through a wire, and an end of the optical fiber is in contact with the indicator light.

In an embodiment, a light-transmitting layer is attached into the first placement groove through the double-sided adhesive or the adhesive.

In an embodiment, the sides of the first aluminum alloy frame and the sides of the second aluminum alloy frame are both fixedly connected with multiple sets of isolation columns configured to press the light-transmitting layer, and ends of the multiple sets of isolation columns are disposed to press against sides of the light-transmitting layer.

In an embodiment, the first aluminum alloy frame defines a charging port therein, and the charging port is electrically connected to the control circuit board. The wooden frame defines a plug-in slot corresponding to the charging port, and the charging port is plugged into the plug-in slot.

In an embodiment, the first placement groove in communication with the second placement groove.

In an embodiment, an inner side of the first aluminum alloy frame and an inner side of the second aluminum alloy frame are both fixedly connected with a positioning frame, the positioning frame is configured to locate the light guide plate, and the inner side of the first aluminum alloy frame and the inner side of the second aluminum alloy frame are both fixedly connected with ribs.

In an embodiment, a wireless charging coil module, an IoT module, and an NFC module are attached onto the sides of the light guide plate through the double-sided adhesive or the adhesive, and both the wireless charging coil module and the IoT module are electrically connected to the control circuit board.

Compared to the related art, the beneficial effects of the disclosure are as follows.

Through the design of structures such as the first aluminum alloy frame, the second aluminum alloy frame, the sealing plate, the plug-in cavities defined within the first and second aluminum alloy frames, and the light guide plate and the light strip disposed in the plug-in cavities, and setting of the first and second aluminum alloy frames disposed inside the luminous board, it facilitates the installation process of the luminous board. By having the light strip in contact with the first and second aluminum alloy frames, the heat generated by the light strip during operation can be conducted through the first and second aluminum alloy frames, which can reduce the temperature caused by the operation of the light strip, achieving cooling for the light strip. The design of structures in the disclosure can extend the service life of the light strip and reduce the frequency of device maintenance.

Figure 1:
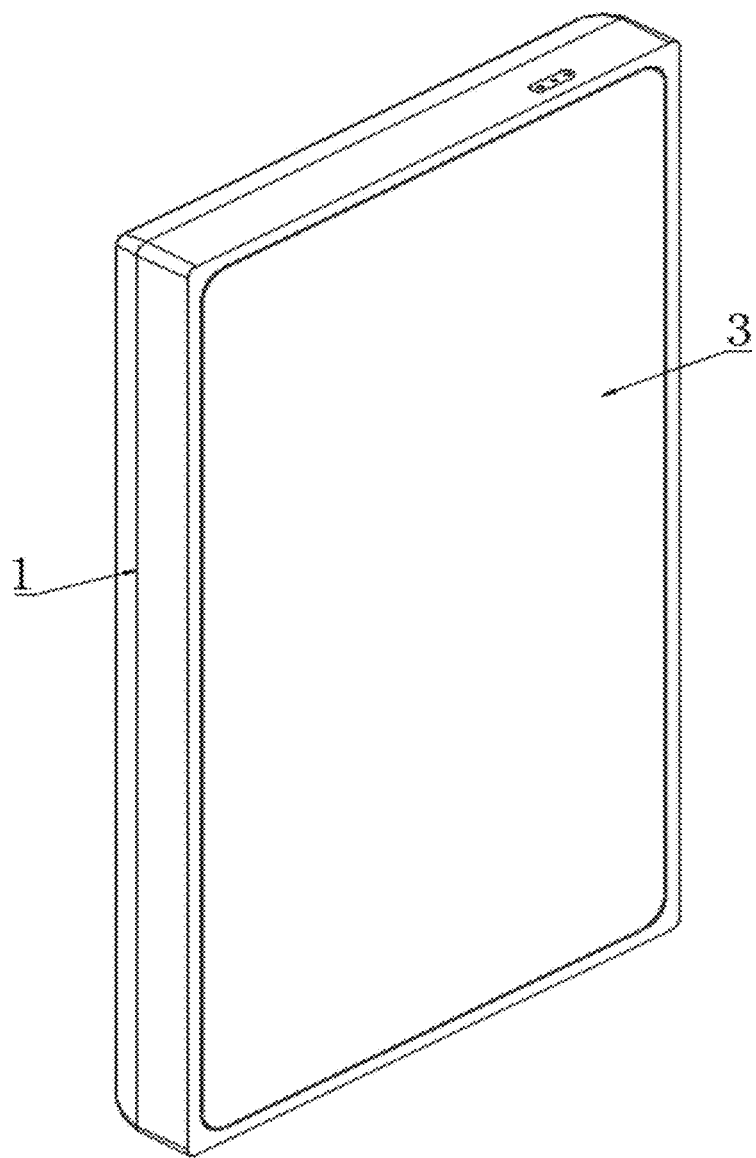
FIG. 1 illustrates a schematic structural diagram of a luminous finished board according to an embodiment of the disclosure.
Figure 2:
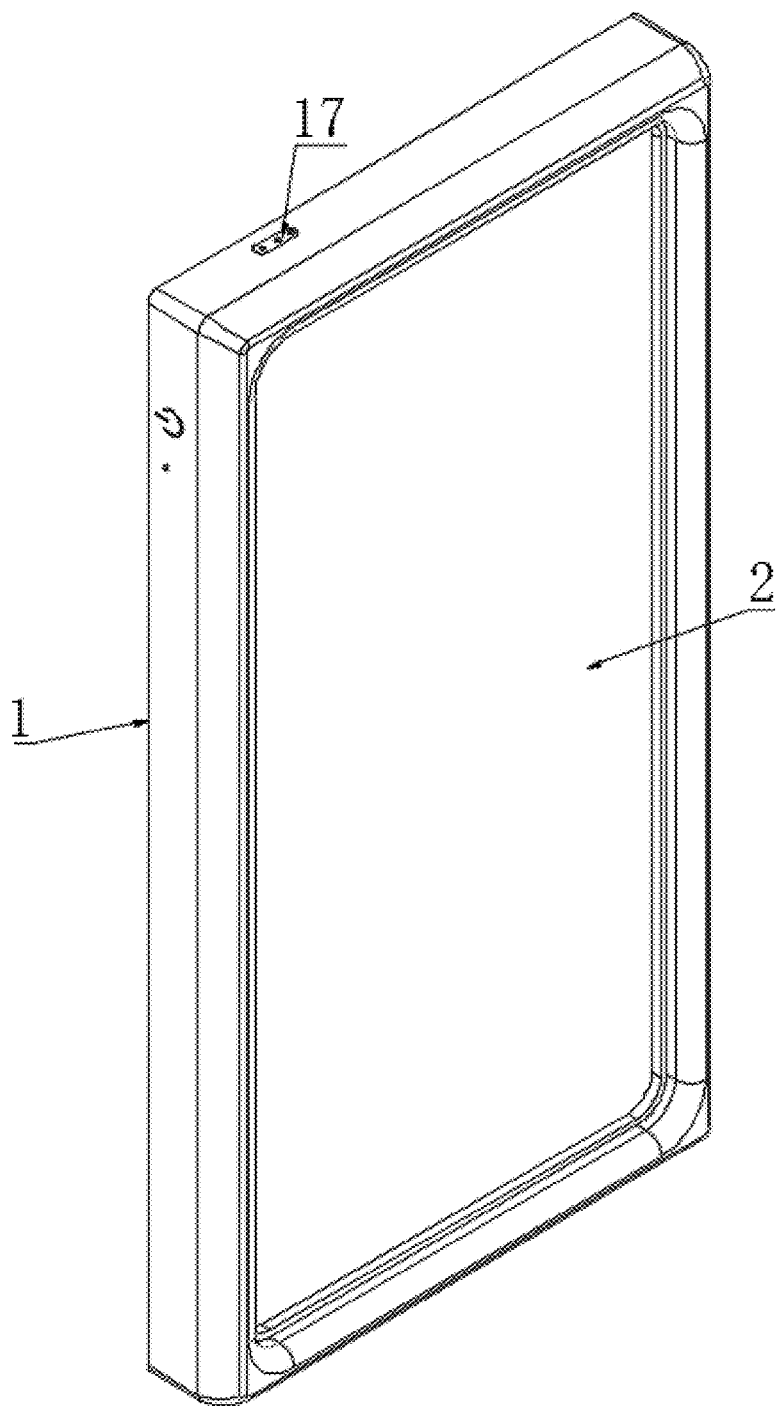
FIG. 2 illustrates another schematic structural diagram of a luminous finished board according to an embodiment of the disclosure.
Figure 3:
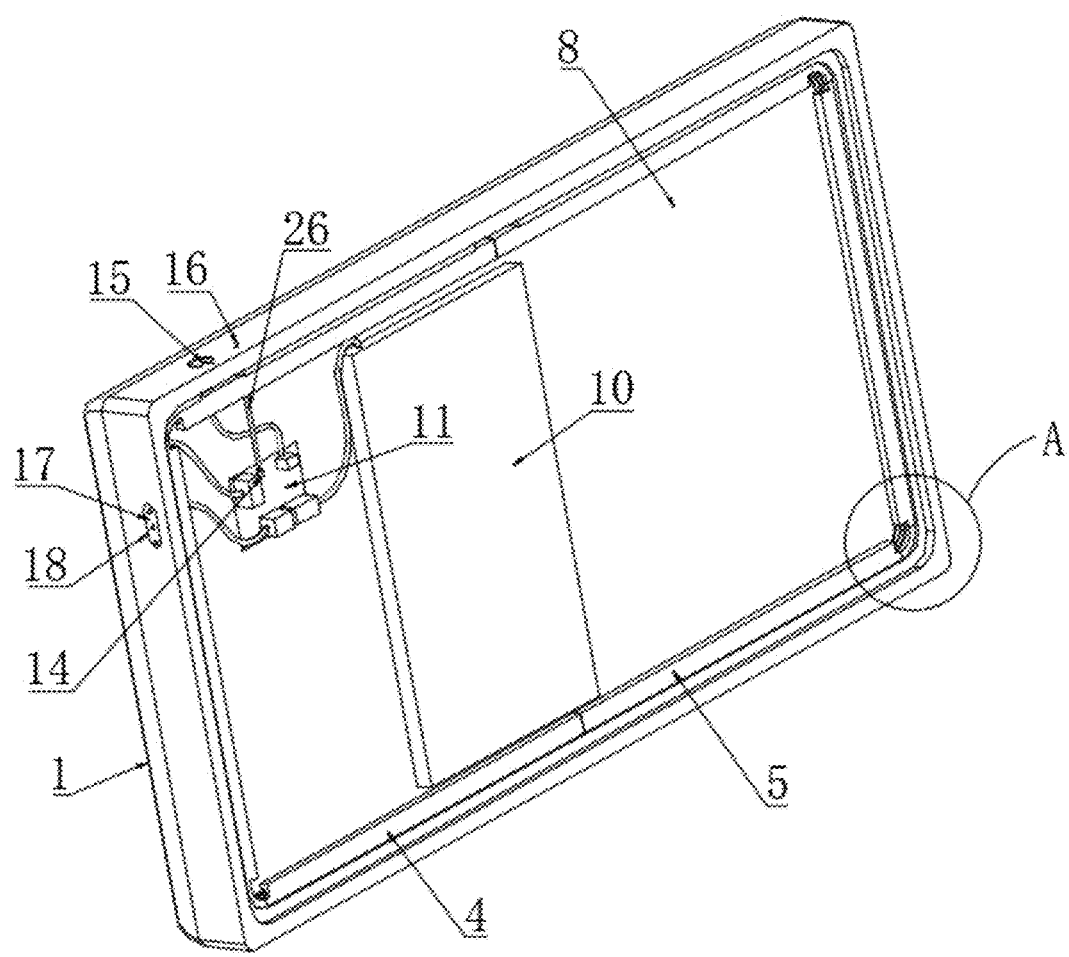
FIG. 3 illustrates a partial structural schematic diagram of a luminous finished board according to an embodiment of the disclosure.
Figure 4:
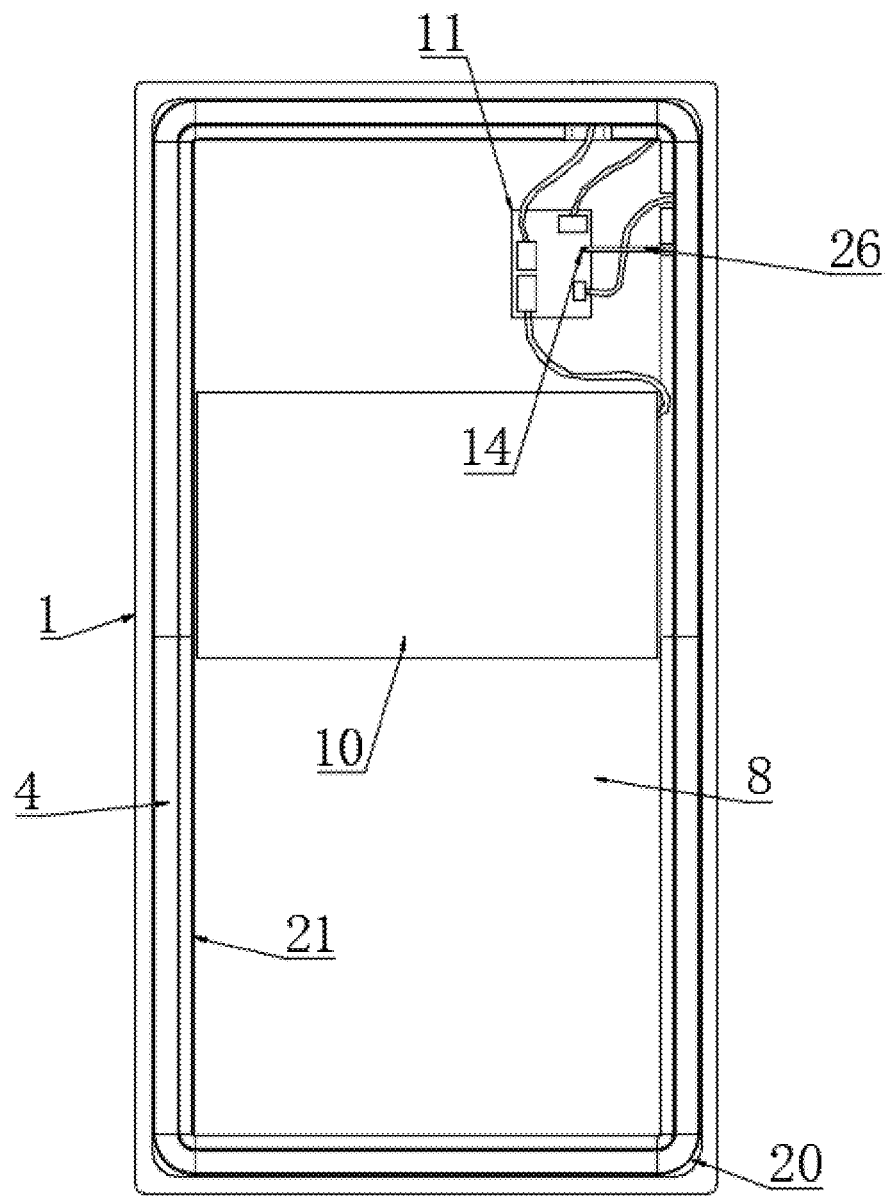
FIG. 4 illustrates another partial structural schematic diagram of a luminous finished board according to an embodiment of the disclosure.
Figure 5:
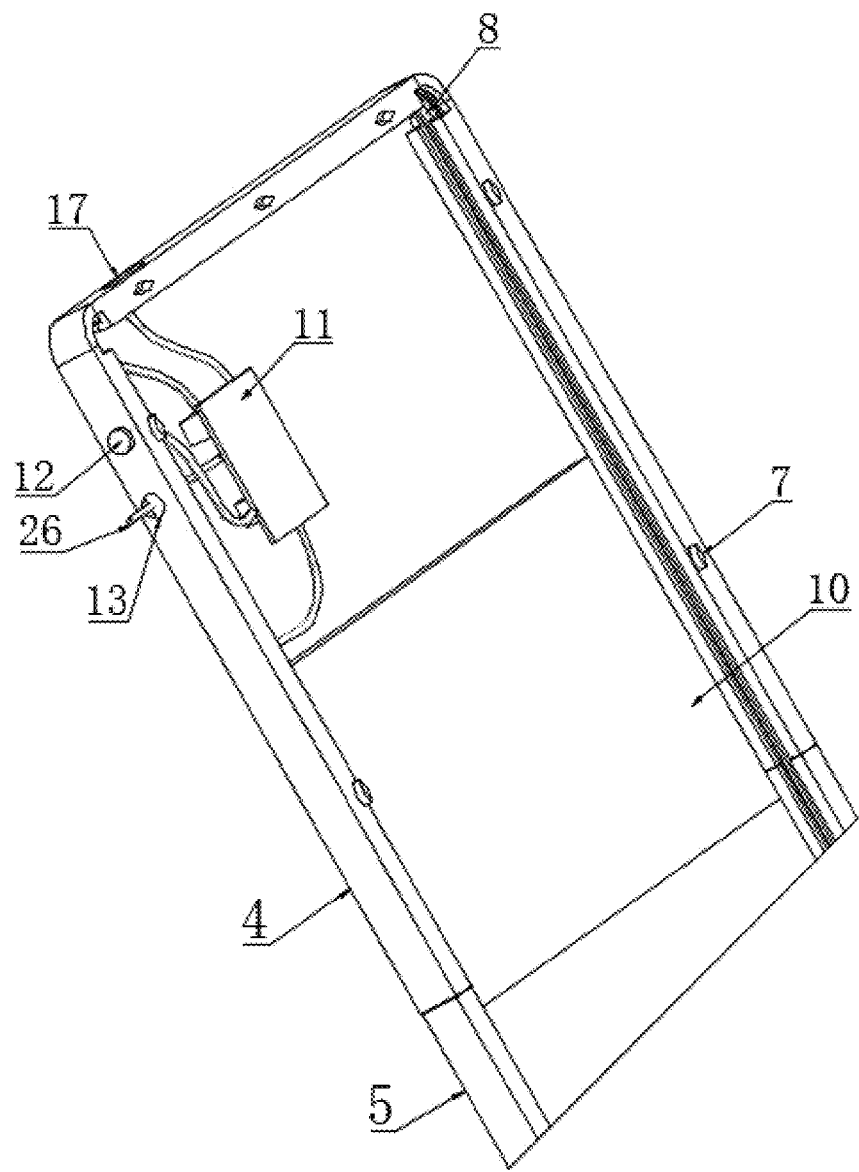
FIG. 5 illustrates a first schematic structural diagram of a first aluminum alloy frame and a second aluminum alloy frame in the disclosure.
Figure 6:
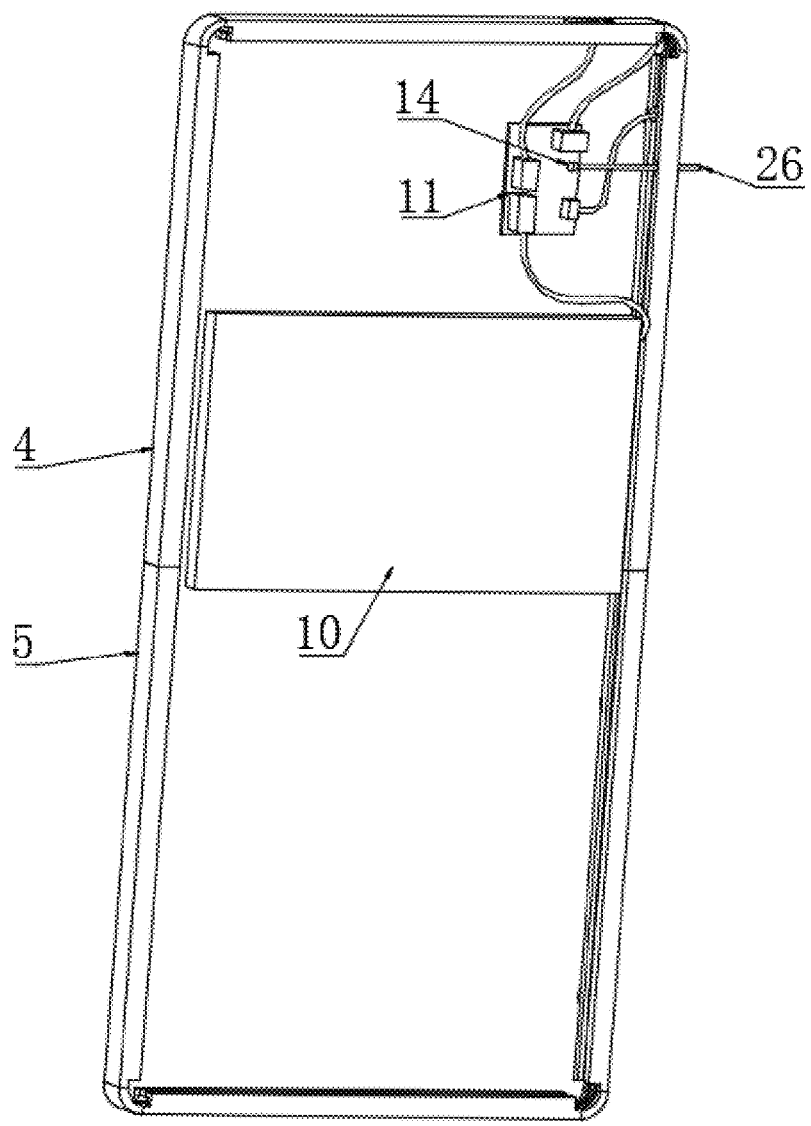
FIG. 6 illustrates a second schematic structural diagram of the first aluminum alloy frame and the second aluminum alloy frame in the disclosure.
Figure 7:
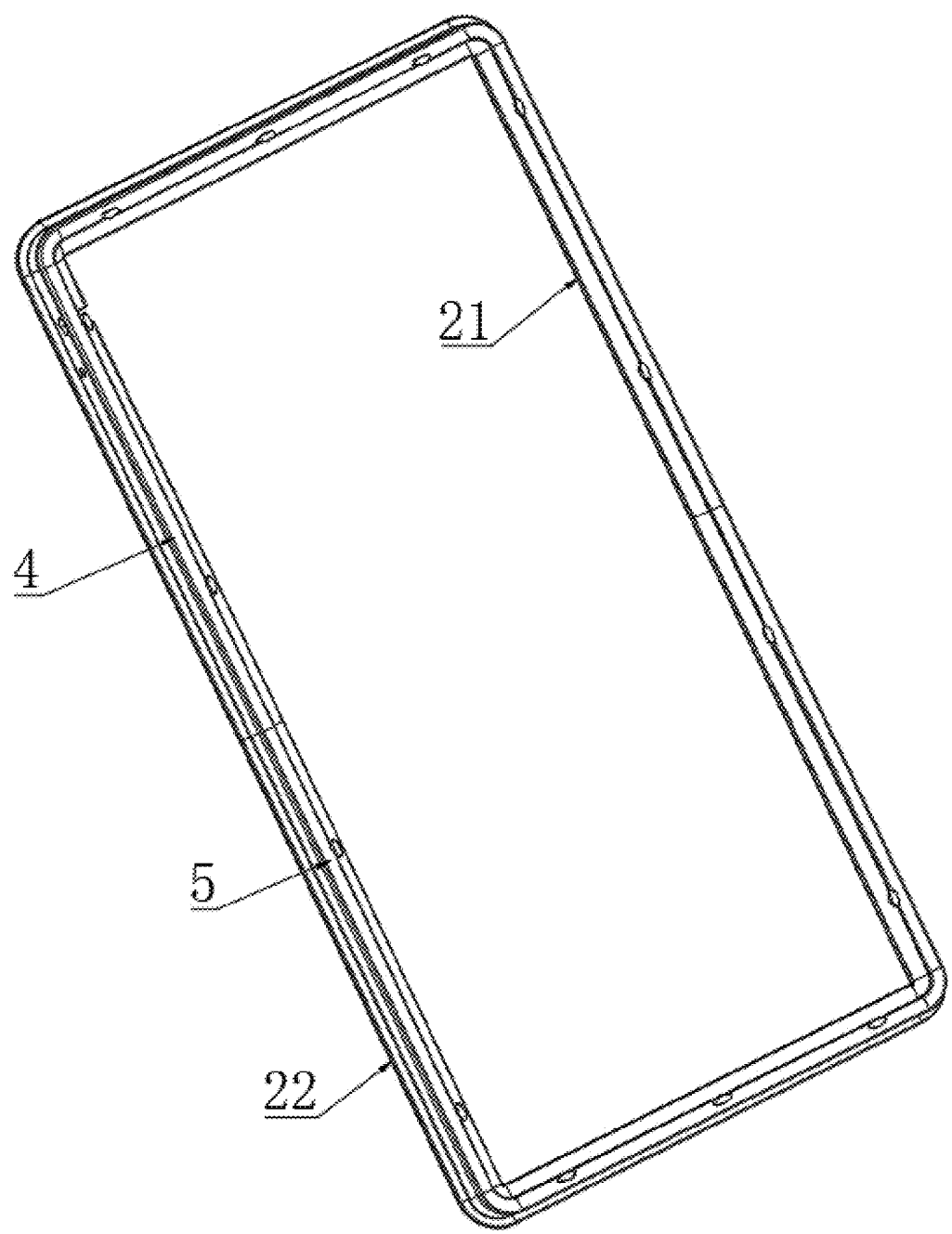
FIG. 7 illustrates a third schematic structural diagram of the first aluminum alloy frame and the second aluminum alloy frame in the disclosure.
Figure 8:
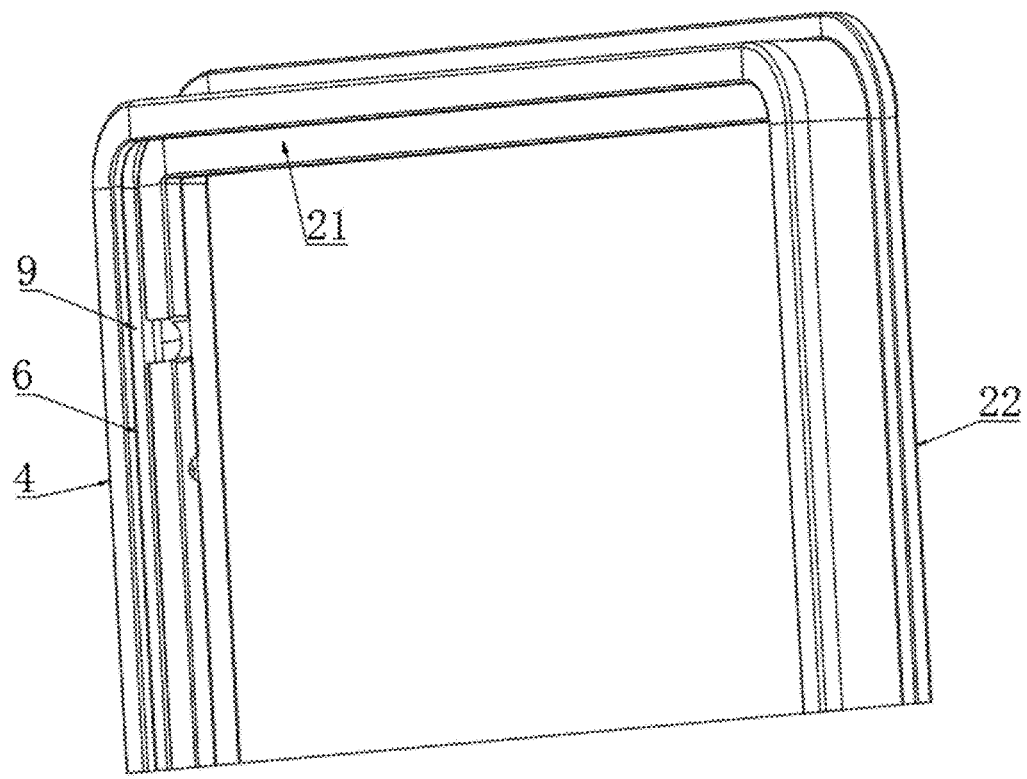
FIG. 8 illustrates a fourth schematic structural diagram of the first aluminum alloy frame and the second aluminum alloy frame in the disclosure.
Figure 9:
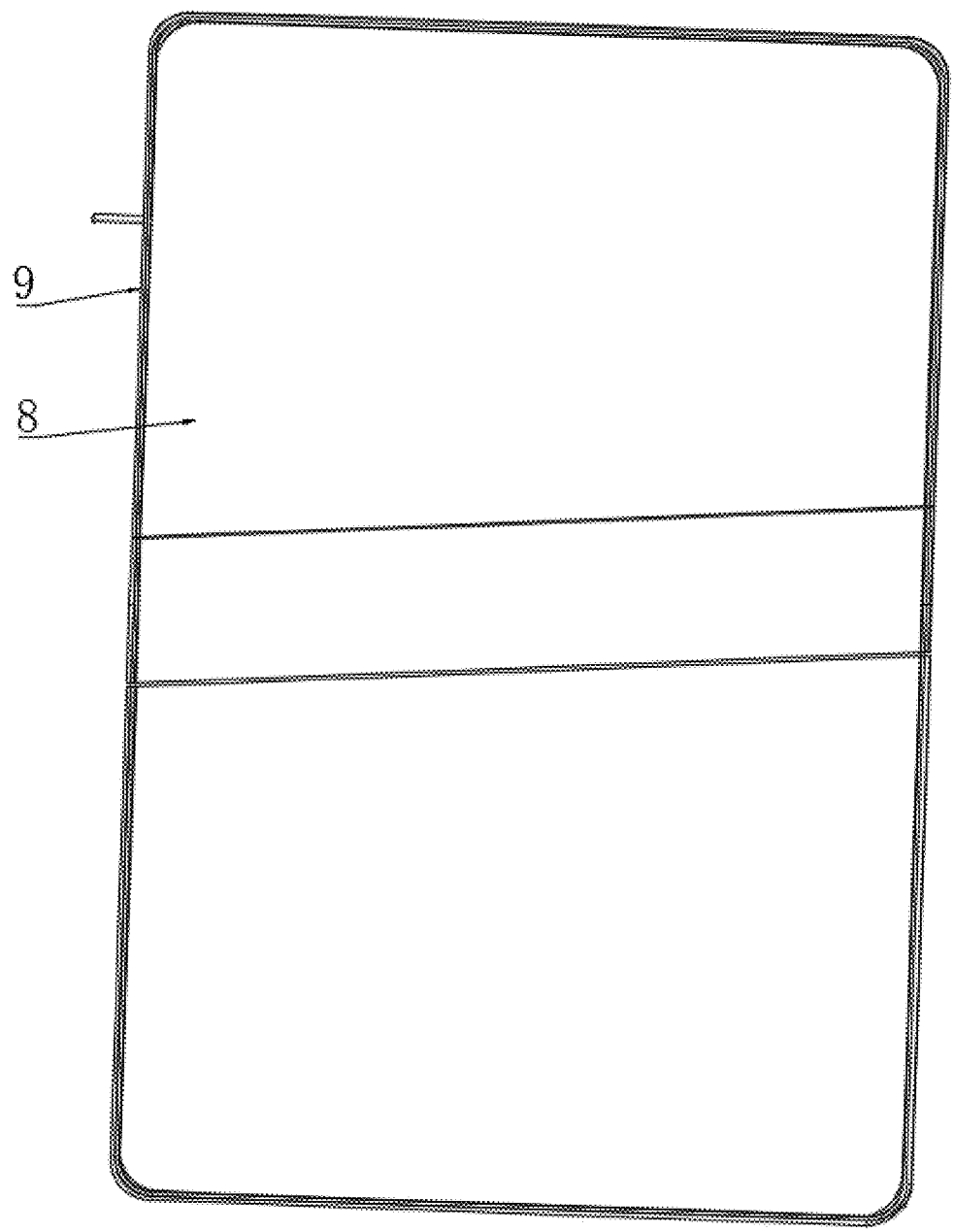
FIG. 9 illustrates a schematic structural diagram of a light guide plate and a light strip in the disclosure.

DESCRIPTION OF REFERENCE NUMERALS 1. wooden frame; 2. light-transmitting layer; 3. sealing plate; 4. first aluminum alloy frame; 5. second aluminum alloy frame; 6. plug-in cavity; 7. isolation column; 8. light guide plate; 9. light strip; 10. battery; 11. control circuit board; 12. touch switch; 13. through-hole; 14. indicator light; 15. switch identifier; 16. observation hole; 17. charging port; 18. plug-in slot; 19. first placement groove; 20. second placement groove; 21. positioning frame; 22. rib; 23. wireless charging coil module; 24. IoT module; 25. NFC module; 26. optical fiber.

DETAILED DESCRIPTION OF EMBODIMENTS

The following will provide a clear and complete description of the technical solution in the embodiments of the disclosure, based on the attached drawings. Apparently, the described embodiments are only a part of the embodiments of the disclosure, not all of them. Based on the embodiments in the disclosure, all other embodiments obtained by those skilled in the art without creative labor are within the scope of protection of the disclosure.

Embodiment 1

As shown in FIGS. 1-9, the technical solution of the disclosure are as follows.

A luminous board includes a wooden frame 1, the wooden frame 1 defines a first placement groove 19 and a second placement groove 20 therein, a first aluminum alloy frame 4 and a second aluminum alloy frame 5 are attached onto the first placement groove 19 through double-sided adhesive or adhesive, and sides of the first aluminum alloy frame 4 and sides of the second aluminum alloy frame 5 are each in contact with inner walls of the first placement groove 19. Each of the first aluminum alloy frame 4 and the second aluminum alloy frame 5 defines a plug-in cavity 6. A light guide plate 8 is inserted in the plug-in cavity 6, and sides of the light guide plate 8 are surrounded by a light strip 9, the light strip 9 is in contact with inner walls of the plug-in cavity 6. A control circuit board 11 and a battery 10 are attached onto the sides of the light guide plate 8 through the double-sided adhesive or the adhesive. The light strip 9 and the battery 10 are both electrically connected to the control circuit board 11, and a sealing plate 3 is attached onto the second placement groove 20 through the double-sided adhesive or the adhesive and is configured to seal the wooden frame 1.

It should be noted that when the first aluminum alloy frame 4 and the second aluminum alloy frame 5 are installed in the first placement groove 19, the first aluminum alloy frame 4 and the second aluminum alloy frame 5 are be in contact with the first placement groove 19, then positions of the first aluminum alloy frame 4 and the second aluminum alloy frame 5 can be positioned. This facilitates the subsequent fixing of the first aluminum alloy frame 4 and the second aluminum alloy frame 5 with the adhesive. Through the first aluminum alloy frame 4 and the second aluminum alloy frame 5, the heat generated by the light strip 9 during operation can be conducted, which can reduce the temperature produced by the light strip 9 due to its operation, achieving cooling for the light strip 9. This, in turn, can extend the service life of the light strip 9 and reduce the frequency of device maintenance.

In addition, the sealing plate 3 is made of stainless-steel metal plate. When the stainless-steel metal plate is used to seal the wooden frame 1, it has excellent corrosion resistance and aesthetic appeal, which can extend the service life of the sealing plate 3.

In an embodiment, a switch identifier 15 is disposed on a side wall of the wooden frame 1, and a touch switch 12 is attached on to an inner side of the wooden frame 1 close to the switch identifier 15 through the double-sided adhesive or the adhesive.

It should be noted that by coordinating the touch switch 12 with the switch identifier 15, the users can easily control the on and off of a luminous picture frame without having to search for a hidden switch or perform complex operations.

In an embodiment, the touch switch 12 is electrically connected to the control circuit board 11. The wooden frame 1 defines an observation hole 16, and an optical fiber 26 is inserted in the observation hole 16. The first aluminum alloy frame 4 defines a through-hole 13, the optical fiber 26 is disposed in the through-hole 13, an indicator light 14 is disposed on the control circuit board 11 and is connected to the control circuit board 11 through a wire, and an end of the optical fiber 26 is in contact with the indicator light 14.

It should be noted that, the light emitted by the indicator light 14 is transmitted through the optical fiber 26 to an outside of the wooden frame 1, providing the users with immediate status feedback. When the touch switch 12 is activated, the indicator light 14 can be seen through the observation hole 16, indicating that the luminous picture frame is working. The touch switch 12 is safer than traditional mechanical switches because it does not have protruding buttons or switch levers, reducing the risk of accidental contact.

In an embodiment, a light-transmitting layer 2 is attached into the first placement groove 19 through the double-sided adhesive or the adhesive.

It should be noted that the light-transmitting layer 2 is selected from one of the light-transmitting plates such as a stone composite panel, a resin light-transmitting sheet with color printing textures, a light-transmitting wood veneer, light-transmitting cement, and glass with printed textures. In this embodiment, the light-transmitting layer 2 is made of the resin light-transmitting sheet. The resin light-transmitting sheet has strong impact resistance and is not easily broken. Its impact resistance is generally 8-10 kilometers per square centimeter (kg/cm$^2$), making it safer and more durable. This characteristic makes resin lenses less likely to shatter when subjected to external impact, thereby protecting the internal components of the device.

In an embodiment, the sides of the first aluminum alloy frame 4 and the sides of the second aluminum alloy frame 5 are both fixedly connected with multiple sets of isolation columns 7 configured to press the light-transmitting layer 2, and ends of the multiple sets of isolation columns 7 are disposed to press against sides of the light-transmitting layer 2.

It should be noted that the purpose of setting the isolation columns 7 is to reinforce gaps between the light-transmitting layer 2 and the first aluminum alloy frame 4, as well as the second aluminum alloy frame 5. The isolation columns 7 are designed to be made of adhesive or other solids that can fix the light-transmitting layer 2.

In an embodiment, the first aluminum alloy frame 4 defines a charging port 17 therein, and the charging port 17 is electrically connected to the control circuit board 11. The wooden frame 1 defines a plug-in slot 18 corresponding to the charging port 17, and the charging port 17 is plugged into the plug-in slot 18.

It should be noted that by setting the charging port 17 as a magnetic charging interface, the design is simple and elegant. The magnetic attraction achieves automatic alignment and connection, eliminating the cumbersome alignment process required by traditional interfaces during plugging and unplugging. Moreover, the magnetic charging interface has better dust and water resistance, which can reduce the risk of charging failures caused by water stains, dust, and other contaminants. It provides better stability and safety, and reduces the risk of unexpected power outages or short circuits due to loosen charging interfaces.

In an embodiment, the first placement groove 19 is in communication with the second placement groove 20.

It should be noted that the first aluminum alloy frame 4 and the second aluminum alloy frame 5 can be attached onto the first placement groove 19 through the second placement groove 20.

Embodiment 2

Figure 10:
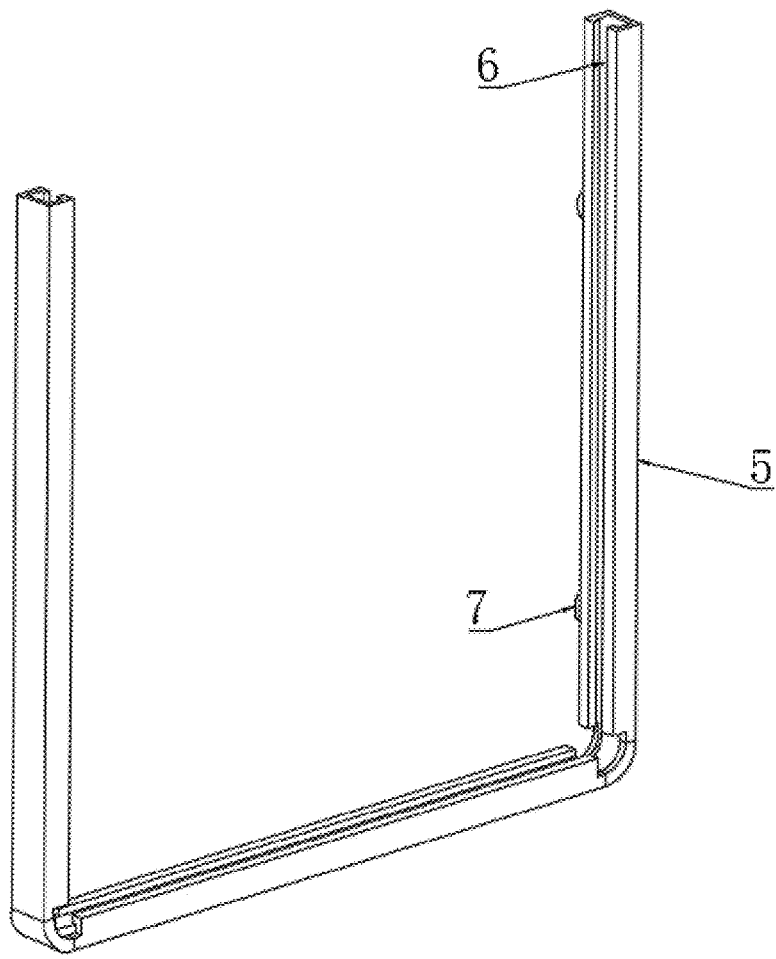
FIG. 10 illustrates a schematic structural diagram of the second aluminum alloy frame in the disclosure.
Figure 11:
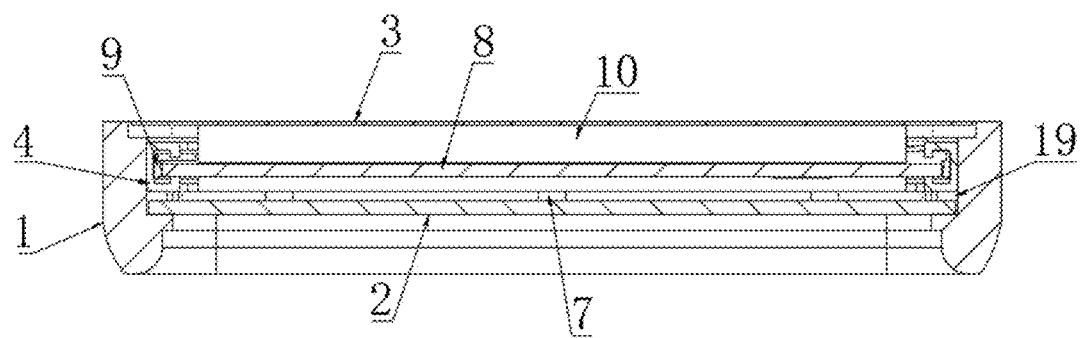
FIG. 11 illustrates a schematic cross-sectional structural diagram of a luminous finished board according to an embodiment of the disclosure.
Figure 12:
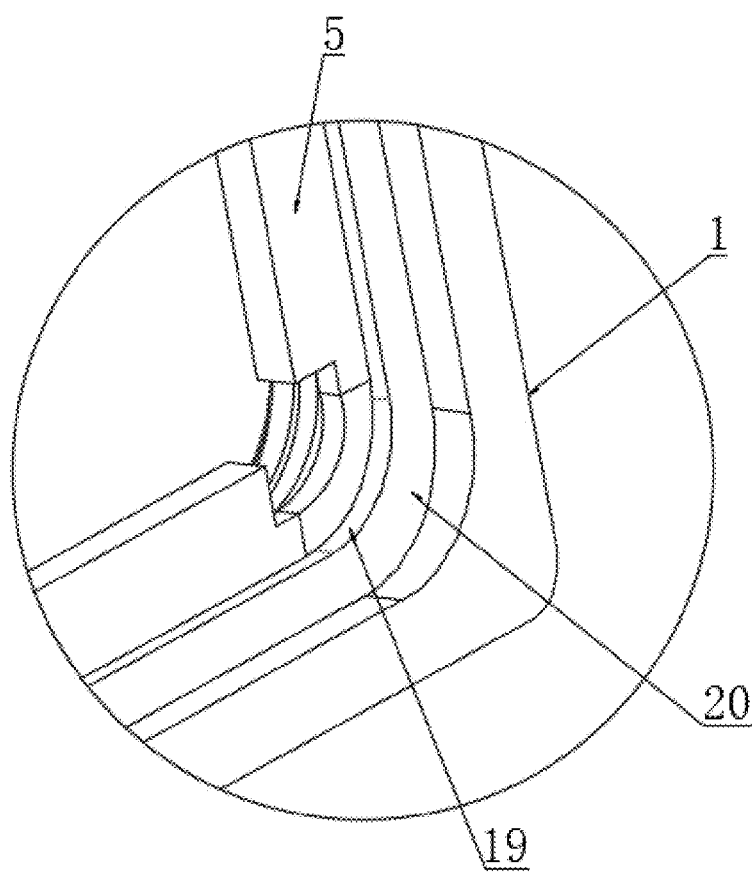
FIG. 12 illustrates schematic enlarged structural diagram of portion A illustrated in FIG. 3 in the disclosure.

As shown in FIGS. 10 to 12, another luminous board is provided as follows.

The differences from the embodiment 1 are as follows. An inner side of the first aluminum alloy frame 4 and an inner side of the second aluminum alloy frame 5 are both fixedly connected with a positioning frame 21, the positioning frame 21 is configured to locate the light guide plate 8, and the inner side of the first aluminum alloy frame 4 and the inner side of the second aluminum alloy frame 5 are both fixedly connected with ribs 22.

It should be noted that the positioning frame 21 is configured to position and support the light guide plate 8, thereby providing a better installation effect for the light guide plate 8. With the setting of the ribs 22, when the first aluminum alloy frame 4 and the second aluminum alloy frame 5 are installed, the ribs 22 can be placed within the second placement groove 20. After the sealing plate 3 is installed, it can press against the ribs 22, thereby enhancing the installation and fixation effect of the first aluminum alloy frame 4 and the second aluminum alloy frame 5.

In addition, the heat generated by the operation of the light strip 9 is conducted through the first aluminum alloy frame 4 and the second aluminum alloy frame 5 to the ribs 22. The ribs 22 can then transfer the heat generated by the light strip 9 to the sealing plate 3, the sealing plate 3 is configured to dissipate the heat, thereby achieving the heat dissipation.

Embodiment 3

Figure 13:
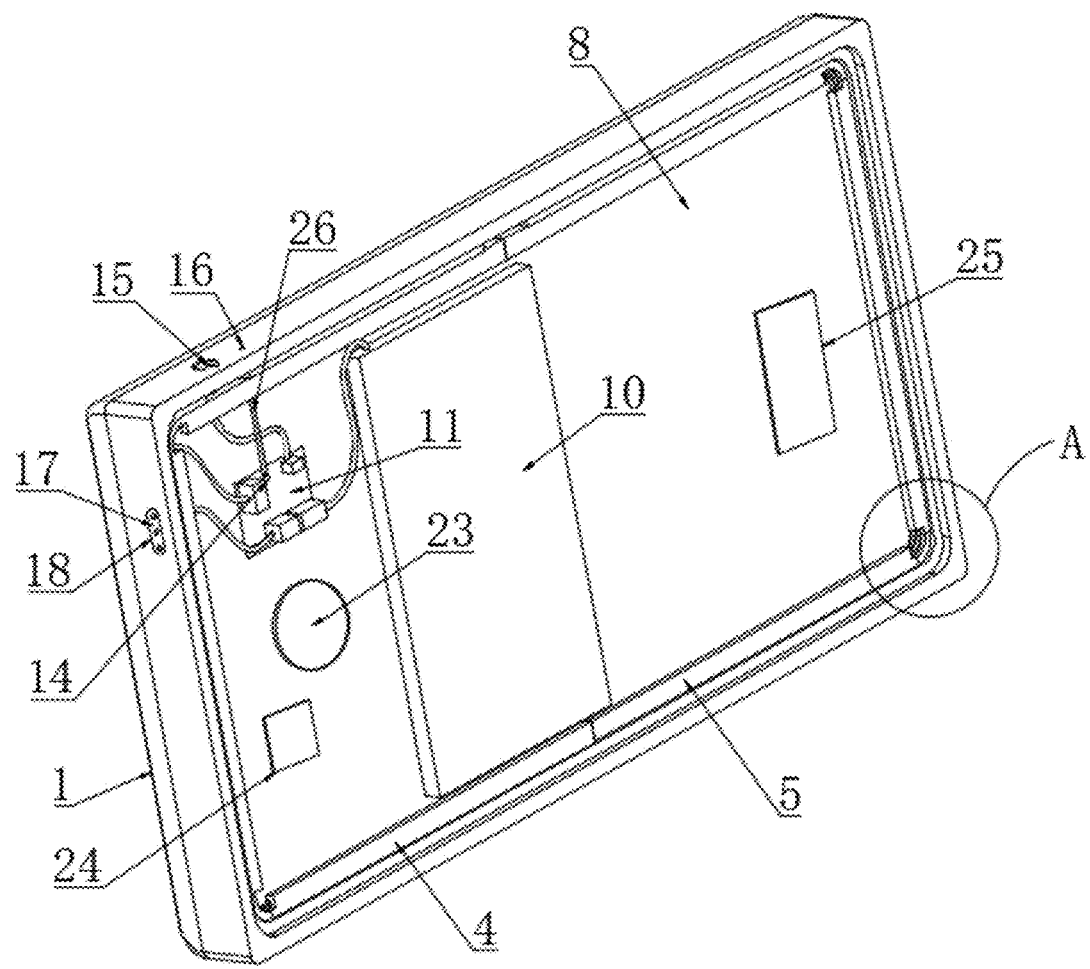
FIG. 13 illustrates still another schematic structural diagram of a luminous finished board according to an embodiment of the disclosure.

As shown in FIG. 13, another luminous board is provided. Based on the embodiment 1, one or more of an IoT module 24, an NFC module 25, and a wireless charging coil module 23 are added into the luminous board. The modules in the embodiment 3 can be combined arbitrarily with the settings in embodiment 1 or can all appear together.

The wireless charging coil module 23, the IoT module 24, and the NFC module 25 are attached onto the sides of the light guide plate 8 through the double-sided adhesive or the adhesive, and both the wireless charging coil module 23 and the IoT module 24 are electrically connected to the control circuit board 11.

It should be noted, each of the wireless charging coil module 23, the IoT module 24, and the NFC module 25 of the disclosure may be implemented through a combination of hardware and software, which is not limited herein.

It should be noted that the IoT module 24 is provided with Wi-Fi™ or Bluetooth™, which allows for coordination with other smart home terminals through network connections, such as controlling the brightness and on/off of the lighting through voice commands with devices like Xiaomi's Xiaoai speaker, Apple's HomeKit, Amazon's Alexa, etc. The wireless charging coil module 23 enables wireless charging of the battery 10, which enhances the convenience of charging the device.

The NFC module 25 serves as an independent identity recognition module, which can be included or excluded in any case individually, facilitating product traceability management, warranty and after-sales management, as well as marketing.

Although embodiments of the disclosure have been shown and described, it will be understood by those skilled in the art that various changes, modifications, replacements, and variations can be made to these embodiments without departing from the principles and spirit of the disclosure. The scope of the disclosure is defined by the appended claims and their equivalents.

What is claimed is:

1. A luminous board, comprising a wooden frame (1); wherein the wooden frame (1) defines a first placement groove (19) and a second placement groove (20) therein, a first aluminum alloy frame (4) and a second aluminum alloy frame (5) are attached onto the first placement groove (19) through double-sided adhesive or adhesive, and sides of the first aluminum alloy frame (4) and sides of the second aluminum alloy frame (5) are each in contact with inner walls of the first placement groove (19); each of the first aluminum alloy frame (4) and the second aluminum alloy frame (5) defines a plug-in cavity (6), a light guide plate (8) is inserted in the plug-in cavity (6), and sides of the light guide plate (8) are surrounded by a light strip (9), the light strip (9) is in contact with inner walls of the plug-in cavity (6); a control circuit board (11) and a battery (10) are attached onto the sides of the light guide plate (8) through the double-sided adhesive or the adhesive, the light strip (9) and the battery (10) are both electrically connected to the control circuit board (11), and a sealing plate (3) is attached onto the second placement groove (20) through the double-sided adhesive or the adhesive and is configured to seal the wooden frame (1).

2. The luminous board as claimed in claim 1, wherein a switch identifier (15) is disposed on a side wall of the wooden frame (1), and a touch switch (12) is attached on to an inner side of the wooden frame (1) close to the switch identifier (15) through the double-sided adhesive or the adhesive.

3. The luminous board as claimed in claim 2, wherein the touch switch (12) is electrically connected to the control circuit board (11).

4. The luminous board as claimed in claim 3, wherein the wooden frame (1) defines an observation hole (16), and an optical fiber (26) is inserted in the observation hole (16); and the first aluminum alloy frame (4) defines a through-hole (13), the optical fiber (26) is disposed in the through-hole (13), an indicator light (14) is disposed on the control circuit board (11) and is connected to the control circuit board (11) through a wire, and an end of the optical fiber (26) is in contact with the indicator light (14).

5. The luminous board as claimed in claim 1, wherein a light-transmitting layer (2) is attached into the first placement groove (19) through the double-sided adhesive or the adhesive.

6. The luminous board as claimed in claim 5, wherein the sides of the first aluminum alloy frame (4) and the sides of the second aluminum alloy frame (5) are both fixedly connected with a plurality of sets of isolation columns (7) configured to press the light-transmitting layer (2), and ends of the plurality of sets of isolation columns (7) are disposed to press against sides of the light-transmitting layer (2).

7. The luminous board as claimed in claim 1, wherein the first aluminum alloy frame (4) defines a charging port (17) therein, the charging port (17) is electrically connected to the control circuit board (11), the wooden frame (1) defines a plug-in slot (18) corresponding to the charging port (17), and the charging port (17) is plugged into the plug-in slot (18).

8. The luminous board as claimed in claim 1, wherein the first placement groove (19) is in communication with the second placement groove (20).

9. The luminous board as claimed in claim 1, wherein an inner side of the first aluminum alloy frame (4) and an inner side of the second aluminum alloy frame (5) are both fixedly connected with a positioning frame (21), the positioning frame (21) is configured to locate the light guide plate (8), and the inner side of the first aluminum alloy frame (4) and the inner side of the second aluminum alloy frame (5) are both fixedly connected with ribs (22).

10. The luminous board as claimed in claim 1, wherein a wireless charging coil module (23), an Internet of Things (IoT) module (24), and a near field communication (NFC) module (25) are attached onto the sides of the light guide plate (8) through the double-sided adhesive or the adhesive, and both the wireless charging coil module (23) and the IoT module (24) are electrically connected to the control circuit board (11).

* * * * *